UNITED STATES PATENT OFFICE.

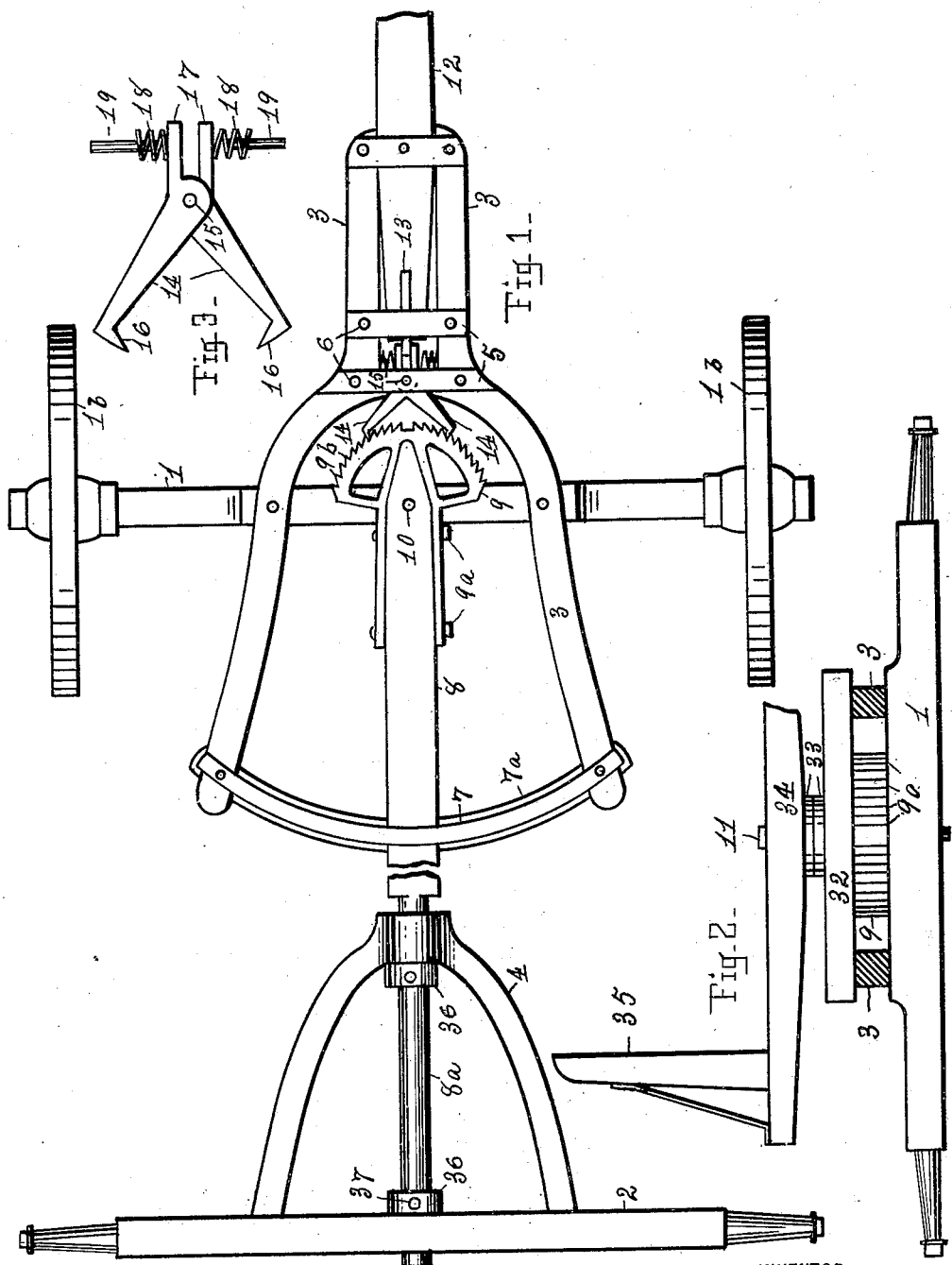

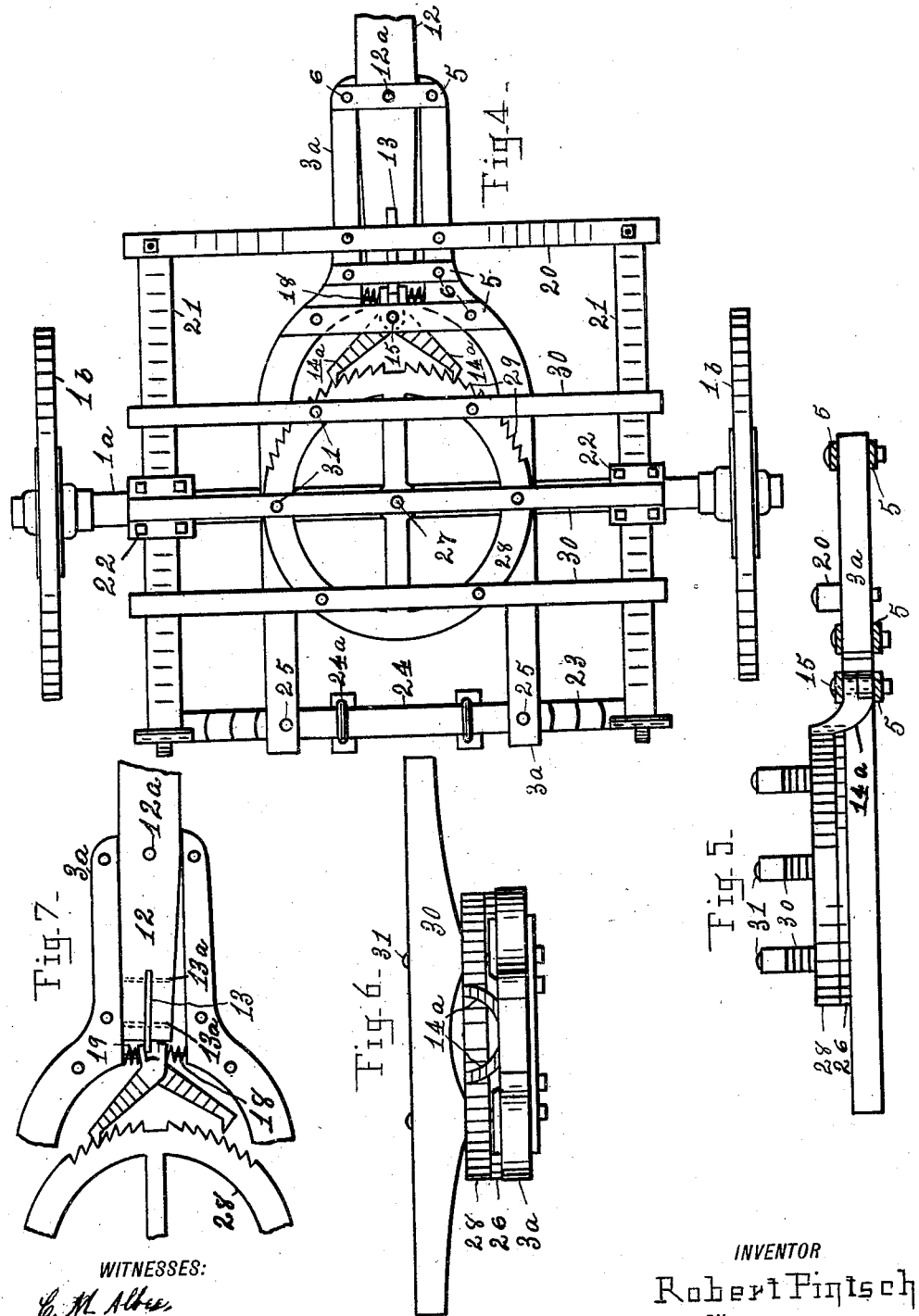

ROBERT PINTSCH, OF MENASHA, WISCONSIN.

RUNNING-GEAR FOR FOUR-WHEELED VEHICLES.

No. 917,127.  Specification of Letters Patent.  Patented April 6, 1909.

Application filed June 17, 1908. Serial No. 438,970.

To all whom it may concern:

Be it known that I, ROBERT PINTSCH, a citizen of the United States, residing at Menasha, in the county of Winnebago and State of Wisconsin, have invented a new and useful Running-Gear for Four-Wheeled Vehicles, of which the following is a specification.

My invention relates to a mechanism which is connected to a part of the running gear, either the reach or the fifth wheel when one is used, and it consists of a circular segment or an entire wheel, as the case may be, provided with teeth upon a part of its forward surface, which teeth are engaged by two pawls and normally hold the tongue of the vehicle from swinging to the right or left, the tongue being pivotally mounted, and its rear end provided with a trip finger which disengages a spring pressed pawl from engagement with the toothed member as the tongue is swung a limited amount to the right or left, and when so swung and the pawls disengaged, or rather one of them, the forward wheels can be cramped around, while the tongue is pressed in that direction sufficiently hard to hold the pawl upon that side of the toothed member out of engagement with the teeth thereof, and its object is, to relieve the team of the lateral swing of the tongue when traveling, and prevent the making of sore necks upon the team; the mechanism being illustrated in the accompanying drawing, in which,—

Figure 1 is a plan showing a pair of forward wheels upon an axle, the rear axle, a reach connecting the axles, hounds upon the forward axle having a tongue mounted upon a pivot bolt between the hounds, a toothed segmental casting upon the forward end of the reach adapted to be connected with the forward axle by the king bolt, and the rear end of the reach made round and connected with the rear hounds and axle, and two spring pressed pawls mounted between the forward hounds and in engagement with the forward extending arms of the pawls. Fig. 2 is a front elevation showing the forward axle, a transverse section of the hounds, the toothed segmental casting between the hounds, the sand bar above the hounds, bolster plates upon the sand bar and a bolster with one end stake above the bolster plates. Fig. 3 is a plan upon an enlarged scale of the two pawls with their springs and spring guiding rods. Fig. 4 is a plan of a pair of forward wheels and their axle, the rear end of the tongue pivoted for a limited lateral swing between hounds, two pawls pivoted between the hound spacing plates, and the toothed member adapted for application to a platform gear having side and end springs by making the toothed member a part of the fifth wheel, no reach being required. Fig. 5 is a side elevation of the inside of the hounds in Fig. 4, the tongue being removed and showing a side elevation of the toothed member, and an end elevation of the bolsters above the fifth wheel, the platform springs being omitted. Fig. 6 is a front elevation of the front hounds, the toothed fifth wheel member, and a bolster above said wheel. Fig. 7 is a plan of part of the forward hounds with the tongue pivotally mounted between them, their connecting bars being omitted, the tongue being swung to one side and thereby showing one of the pawls out of engagement with the toothed part of the mechanism.

Similar numerals and letters indicate like parts in the several views.

1 and 1ª, indicate front axles in Figs. 1 and 4 respectively; 1ᵇ, their wheels; 2, rear axle in Fig. 1; 3, 3ª, front axle hounds; 4, rear axle hounds; 5, bars spacing the hounds apart; 6, bolts for bolting the spacing bars to the hounds; 7, 7ª, upper and lower circles respectively at the rear ends of the hounds in Fig. 1; a reach having a rectangular front end 8, and a round rear end 8ª, connects front and rear axles; 9, is a toothed segment having oppositely facing teeth, 9ᵇ, bolted upon the forward end of the reach with bolts 9ª, through the bore 10 of which reach a king bolt 11 passes for connecting the reach and front axle.

12, is the rear end of a tongue, pivoted upon the bolt 12ª, between the forward ends of the hounds 3, its rear end extending to a distance toward the axle and is narrowed up at said rear end for permitting a limited lateral swing of the tongue. At its rear end a finger 13, extends toward the axle, the finger being a metallic piece about 2x8 inches and ⅝ of an inch thick inserted edgewise through the tongue and secured with rivets 13ª, shown by dotted lines in Fig. 7. Between two spacing bars 5, two pawls, 14, are pivoted upon the pivot bolt 15, the pawls being similar in form, made "rights and lefts", and provided with tooth engaging ends 16, and forward extending arms 17, the arms when the pawls are pivoted together, extending forward, one each side of the finger 13 of the tongue.

18, are springs, one between an arm of a pawl and the inner side of a hound. The springs may be a coiled wire spring and be mounted between the inside of a hound and an arm 17 of the pawl, and a rod 19, extended out from the inside of each hound for sustaining the spring in position. These springs should have sufficient rigidity and stiffness to hold the pawls in engagement with the toothed surface until the swinging of the tongue to the right or left overcomes the tension of the spring and causes the finger 13 to trip the pawl and permit the tongue to continue its swing without hindrance from the toothed member, until the desired curve in the course of travel for the vehicle has been arrived at. Upon the tongue being swung in the opposite direction, the pawl upon that side will be thrown out of engagement with the toothed member, while the finger 13 will engage with the arm of the other pawl and throw the catch of that pawl out of engagement with the toothed member, when the vehicle will be free to be turned in the opposite direction, the required amount as before. When the pawls are both in mesh with the toothed member, unless the tongue is swung to the right or left with sufficient force to overcome the resiliency of the spring, the tongue will remain without the lateral swing which is occasioned by the slight unevenness of the ordinary roadway.

In Fig. 4, the hounds 3ª, carry a transverse bar 20, from which the forward ends of two side springs 21, are suspended, the springs being secured mid-way their ends by the clips and bolts 22, upon the axle, and at their rear ends the ends of the rear spring 23 are suspended, said rear spring being suspended mid-way its ends from the cross bar 24, by the clip bolts 24ª, the cross bar being suspended by the bolts 25 from the rear ends of the hounds 3ª. Upon said hounds the lower part of a fifth wheel circle 26 is secured and above that, pivoted to revolve upon the bolt 27, is the upper half of it, 28, having teeth 29 around a part of its circumference which are engaged by the pawls 14ª, they being like the pawls 14, excepting that their teeth engaging ends 14ª, are curved upward so as to reach up to and engage the teeth of the upper half of the fifth wheel. Above this fifth wheel, bolsters 30 are mounted and are secured in position with bolts 31. Variations in the form and arrangement of the gearing may require a different form and arrangement of the operating mechanism between the tongue and toothed member, which I consider as within the scope of my invention.

In Fig. 2, a sand bar 32 is mounted over the hounds 3 and toothed segment 9, above which are bolster plates 33, a bolster 34 and a bolster stake 35. The purpose of forming a part of the reach round is, to permit it to be connected loosely with the rear axle and hounds and permit the rear axle to assume a position out of the horizontal plane of the front axle, without its affecting the perfect working of the pawls with the toothed segment. Collars 36, are mounted upon said round part of the reach and are secured thereto with pins 37, for drawing forward or backing the rear axle in accordance with the movements of the forward axle.

Other means of connecting up the reach so as to permit the rear axle to assume a position out of the plane of the forward axle will occur to the mechanic for avoiding a disarrangement in the working of the toothed member and pawls while the vehicle is being drawn over slight obstructions and uneven ground.

Having described my invention, what I claim and desire to secure by Letters Patent, is,—

1. The combination with a four wheeled vehicle, of a forward axle, a pair of hounds secured upon said axle, a tongue pivotally mounted between the forward ends of the hounds and fitted for a limited horizontal swing of the tongue upon its pivot bolt, a finger extending rearward from the rear end of the tongue, mechanism for connecting the rear to the forward axle by means of a king or pivot bolt, a metallic member having a circular forward end provided with ratchet teeth, the pawl engaging faces of each half of which are arranged facing each other, pivoted upon said axle by said king or pivot bolt for connecting with the rear axle, and its toothed part extending forward of said forward axle, two pawls pivoted between the hounds upon their connecting plates or bars, one for each direction in which said ratchet teeth face, an arm extending from each pawl toward the tongue, one arm on each side of the aforesaid rearward extending tongue finger, a spring arranged between the hounds and each forward extending pawl arm and normally holding the pawls in engagement with the ratchet teeth, said parts being arranged and operating to prevent the side swinging of the tongue when the vehicle is traveling forward over slight obstacles, excepting a limited amount between the hounds.

2. The combination with a four wheeled vehicle, of a forward axle, a pair of hounds secured upon said axle, a tongue pivotally mounted between the forward ends of the hounds and fitted for a limited horizontal swing of the tongue upon its pivot bolt, a finger extending rearwardly from the rear end of the tongue, a reach for connecting the rear to the forward axle, its forward end being connected to the forward axle by means of a king, or pivot bolt and its rear end connected with the rear axle in such a manner as to permit it to assume a position in a different plane from the plane of the forward axle, a metallic member having a circular forward end provided with ratchet teeth, the pawl engaging faces of each half of which are arranged facing each other, said member being connected with said reach and extending forward of the forward axle, two pawls pivoted between the hounds upon their connecting plates or bars, one for each direction in which said ratchet teeth face, an arm extending from each pawl toward the tongue, one arm each side of the aforesaid rearward extending tongue finger, a spring arranged between the hounds, one for each pawl and in engagement with its forward extending arm, said springs normally holding the pawls in engagement with the ratchet teeth, said parts being arranged and operating to prevent the side swinging of the tongue when the vehicle is traveling forward over slight obstructions, excepting a limited amount between the hounds.

ROBERT PINTSCH.

Witnesses:
 CARL KOCH,
 EDMUND LIEBHAUSER.